(12) United States Patent
Koeten

(10) Patent No.: US 11,405,394 B2
(45) Date of Patent: Aug. 2, 2022

(54) TRUST BROKER SYSTEM FOR MANAGING AND SHARING TRUST LEVELS

(71) Applicant: Pulse Secure, LLC, San Jose, CA (US)

(72) Inventor: Robert Koeten, Half Moon Bay, CA (US)

(73) Assignee: Pulse Secure, LLC, San Jose, CA (US)

(*) Notice: Subject to any disclaimer, the term of this patent is extended or adjusted under 35 U.S.C. 154(b) by 360 days.

(21) Appl. No.: 16/668,785

(22) Filed: Oct. 30, 2019

(65) Prior Publication Data

US 2021/0136071 A1 May 6, 2021

(51) Int. Cl.
*H04L 9/40* (2022.01)
*H04L 9/06* (2006.01)
*H04L 9/32* (2006.01)

(52) U.S. Cl.
CPC ........ *H04L 63/0884* (2013.01); *H04L 9/0637* (2013.01); *H04L 9/3218* (2013.01); *H04L 63/0807* (2013.01); *H04L 63/0892* (2013.01)

(58) Field of Classification Search
CPC .................................................. H04L 63/0884
See application file for complete search history.

(56) References Cited

U.S. PATENT DOCUMENTS

| | | | |
|---|---|---|---|
| 9,635,000 B1 | 4/2017 | Muftic | |
| 9,882,918 B1 | 1/2018 | Ford et al. | |
| 2006/0235761 A1* | 10/2006 | Johnson | G06Q 20/12 705/26.1 |
| 2016/0162897 A1 | 6/2016 | Feeney | |
| 2017/0236094 A1* | 8/2017 | Shah | G06Q 10/101 705/300 |
| 2017/0250972 A1 | 8/2017 | Ronda et al. | |
| 2018/0025166 A1 | 1/2018 | Daniel et al. | |
| 2018/0157825 A1 | 6/2018 | Eksten et al. | |
| 2018/0285996 A1* | 10/2018 | Ma | G06F 16/2428 |
| 2019/0104196 A1* | 4/2019 | Li | G06F 9/547 |
| 2019/0132295 A1* | 5/2019 | Lenz | H04L 63/0428 |
| 2019/0289013 A1* | 9/2019 | Makmel | H04L 67/10 |
| 2019/0370813 A1* | 12/2019 | Bravick | H04L 9/0637 |
| 2020/0007315 A1* | 1/2020 | Vouk | H04L 9/0637 |
| 2020/0195436 A1* | 6/2020 | Khan | G06V 30/40 |

(Continued)

FOREIGN PATENT DOCUMENTS

| | | |
|---|---|---|
| GB | 2540977 A | 7/2015 |
| WO | 2017066002 A1 | 4/2017 |
| WO | 2018019364 A1 | 2/2018 |

OTHER PUBLICATIONS

International Search Report and Written Opinion of International Application No. PCT/US2020/057187, dated Jan. 27, 2021, 19 pp.

(Continued)

*Primary Examiner* — Ponnoreay Pich

(57) ABSTRACT

This disclosure is related to devices, systems, and techniques for controlling access to network services based on a trust ledger. In some examples, a trust broker system enables a relying party to control network service access of client device, where the trust broker system comprises one or more computing devices configured to maintain a trust ledger including a trust account balance (TAB) associated with each user of a set of users, where the TAB associated with each user of the set of users represents a value used to determine whether the respective user is permitted to access a resource.

20 Claims, 11 Drawing Sheets

(56) References Cited

U.S. PATENT DOCUMENTS

| | | | | |
|---|---|---|---|---|
| 2020/0204557 A1* | 6/2020 | Singh | .................... | G06F 21/577 |
| 2021/0136071 A1* | 5/2021 | Koeten | ................ | H04L 63/102 |
| 2021/0160056 A1* | 5/2021 | Yan | ....................... | G06F 21/602 |

OTHER PUBLICATIONS

Ouaddah et al., "FairAccess: a new Blockchain-based access control framework for the Internet of Things: FairAccess: a new access control framework for IoT," Wiley Online Library; in Security and Communication Networks, Feb. 2017, 23 pp. (corresponds to article listed on International Search Report).

Xu et al., "BlendCAC: A Blockchain-Enabled Decentralized Capability-Based Access Control for IoTs," 2018 IEEE International Conference on Internet of Things (iThings) and IEEE Green Computing and Communications (GreenCom) and IEEE Cyber, Physical and Social Computing (CPSCom) and IEEE Smart Data (SmartData), Jul. 30-Aug. 3, 2018, pp. 1027-1034.

"Host Checker—Deployment Guide", Pulse Secure, LLC, PCS 8.3R3, Jan. 2019, available at https://www-prev.pulsesecure.net/download/techpubs/current/416/pulse-connect-secure/pcs/8.2rx/How_To_Host_Checker.pdf (last accessed Oct. 30, 2019) 37 pp.

* cited by examiner

TRUST BROKER SYSTEM FOR MANAGING AND SHARING TRUST LEVELS

TECHNICAL FIELD

This disclosure relates to computer networks, and more specifically, to consensus networks.

BACKGROUND

A distributed ledger is a data structure that may be shared and synchronized across a network spanning multiple sites, institutions, and/or geographies. Changes or additions made to the ledger are reflected and copied to many (if not all) participating computing devices (or nodes) on the network. Often, a distributed ledger is implemented on a consensus network, where nodes on the network implement a consensus algorithm intended to achieve reliability and/or agreement among nodes on the network, even where the network might include multiple unreliable or untrustworthy nodes.

A blockchain (e.g., the technology underlying Bitcoin and Ethereum) might be considered a distributed ledger that is managed by distributed computers on a peer-to-peer (P2P) network. Each peer (node) on the network maintains a copy of the ledger, and also uses additional measures to help ensure consensus among a majority of the nodes on the network. A smart contract is a computer protocol typically implemented on a consensus network as part of a blockchain or distributed ledger. Smart contracts may be used on a consensus network to facilitate, verify, and/or enforce the negotiation and/or performance of an agreement, contract, or other set of rules.

SUMMARY

Systems and methods are disclosed for encoding levels of trust in one or more clients as a value in a blockchain-based distributed ledger, associating the value with the one or more clients, and using smart contracts to transfer trust to a client and from a client to a relying party, thereby enabling the client to access a resource that is protected by a relying party. In some examples, a relying party represents an application, service, or resource provider that relies on trust facets encoded in a blockchain distributed ledger to provide access, by a client, to applications, services, and/or resources.

In a typical secure resource access solution, user and/or device authentication is performed by a centralized authority. Upon successful identity authentication, a session is established that in most cases, incorporates an upfront determination of access authorization to specific resources. The session and authorization can be represented by a cookie, token, assertion, or by other means. Additional attributes or context parameters such as, for example, time-of-day, location, organizational role, and device compliance can be incorporated in the policy decision in how and what to authenticate and authorize the user and/or device. This represents a one-time assessment of trust at the time of authentication. Security Assertion Markup Language (SAML), token attributes or alternate centralized services may provide additional context parameters (obtained via the central authority) for the relying party to interpret for subsequent resource requests within the session.

With this model it is difficult, if not impossible, to share trust information with third party systems, except with explicit API's and specific trust relationships between the different solutions (e.g., central authorities). In addition, the relying parties generally are not able to exchange or re-assess the session context and trust information based on the access patterns of a user or device or based on user or device behavior during the session. Additional security analytics services would be required to interpret behavior within the session, but even then, it would be an out-of-band, reactive approach.

In some examples, a trust broker system enables a relying party to control network service access of a client device, where the trust broker system includes one or more computing devices configured to: maintain a trust ledger including a trust account balance (TAB) associated with each user of a set of users, where the TAB associated with each user of the set of users represents a value used to determine whether the respective user is permitted to access a resource, and where by maintaining the trust ledger. The one or more computing devices enable each device of a set of devices having access to the trust broker system to receive, by a respective device of the set of devices, a request for a TAB associated with a user of the set of users, determine, based on the trust ledger, the TAB associated with the user of the set of users, and output, by the respective device of the set of devices, information indicative of the TAB associated with the user of the set of users.

In some examples, a method includes maintaining, using one or more computing devices, a trust ledger including a trust account balance (TAB) associated with each user of a set of users, where the TAB associated with each user of the set of users represents a value used to determine whether the respective user is permitted to access a resource, and where by maintaining the trust ledger, the method further includes enabling each device of a set of devices having access to the trust broker system to perform receiving, by a respective device of the set of devices, a request for a TAB associated with a user of the set of users, determining, based on the trust ledger, the TAB associated with the user of the set of users, and outputting, by the respective device of the set of devices, information indicative of the TAB associated with the user of the set of users.

In some examples, a non-transitory computer-readable medium includes instructions for causing one or more processors to maintain a trust ledger including a trust account balance (TAB) associated with each user of a set of users, where the TAB associated with each user of the set of users represents a value used to determine whether the respective user is permitted to access a resource, and where by maintaining the trust ledger, the one or more processors enable each device of a set of devices having access to the trust broker system to receive, by a respective device of the set of devices, a request for a TAB associated with a user of the set of users, determine, based on the trust ledger, the TAB associated with the user of the set of users, and output, by the respective device of the set of devices, information indicative of the TAB associated with the user of the set of users.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
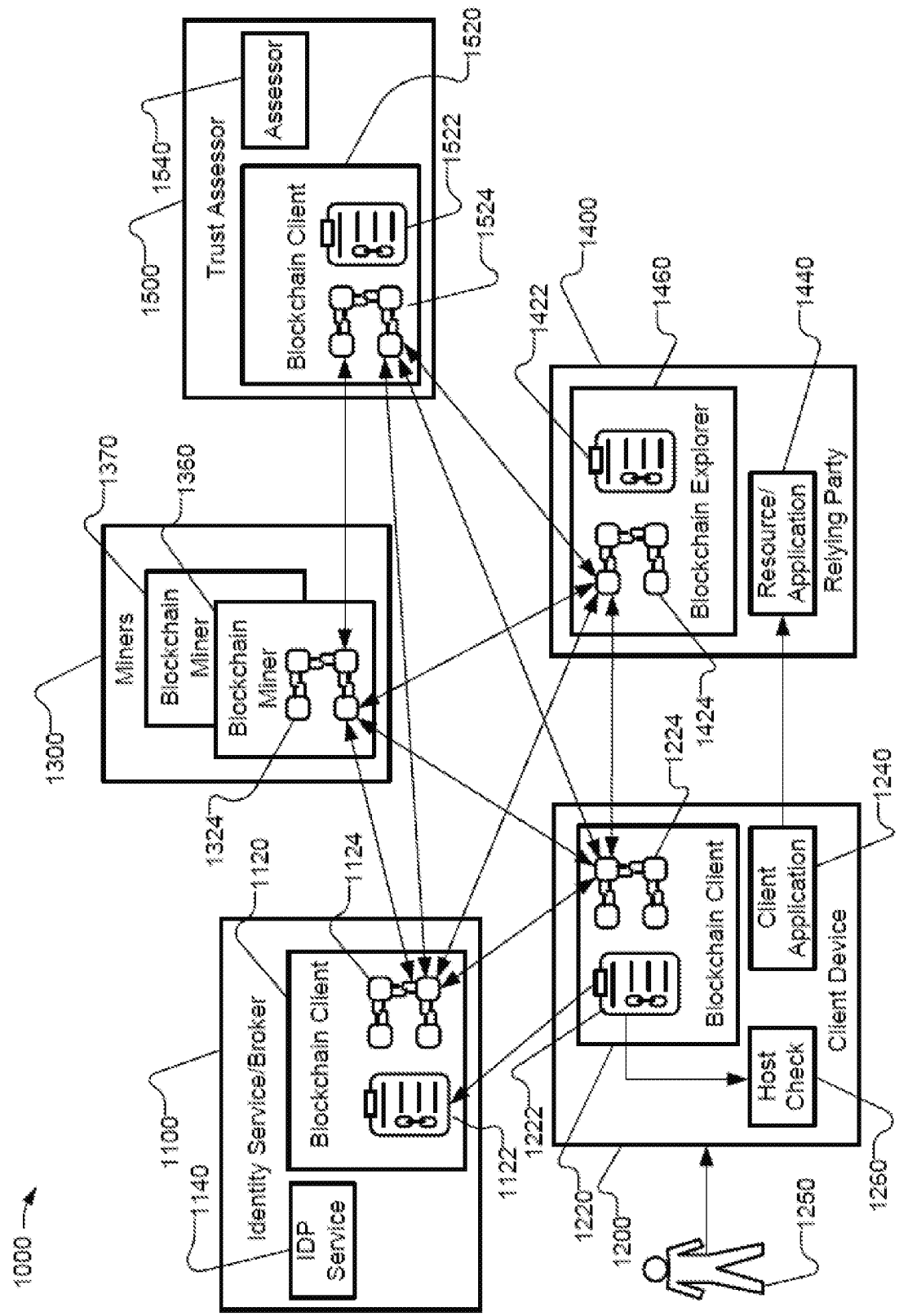
FIG. 1 is a block diagram illustrating a Trust Broker System, in accordance with one or more techniques of this disclosure.

A Trust Broker System includes a permissioned blockchain-based distributed trust ledger which is accessible to system participants. Data elements representing trust in clients, e.g. user and device pairs, are added or removed from the distributed trust ledger by system participants such as, for example, one or more identity providers (IdPs), relying parties, and specialized Trust Broker System trust assessor components. The data elements representing trust are encoded in blocks of the permissioned blockchain-based distributed trust ledger. When a client makes a resource request, for example when a client application requests access to a protected resource, a relying party that controls access to the resource checks the distributed trust ledger to determine trust elements encoded in the ledger that are associated with the client and makes a resource access decision based at least in part upon the trust elements. In some examples, the distributed trust ledger includes the chain of transaction blocks that have been confirmed through Miner consensus, as well as transactions that are in the pipeline to be confirmed.

Trust Account Balance as a Measure of Trust:

In a first example embodiment, the data elements representing trust include trust facets or trust tuples, which may each include multiple trust facets, and each client has an account that includes an associated number of trust facets and/or trust tuples, referred to herein as Trust Account Balance (TAB, also referred to as Trust account balance). A client's TAB is increased upon successful authentication and/or authorization with a central IdP, i.e. one or more trust facets or trust tuples are added to the client's account. A client's TAB can be increased by other Trust Broker System participants, for example by a trust assessor system component or by a system firewall component. This is distinct from known systems that convert or represent trust as a cryptocurrency, e.g. as a known cryptocurrency such as Ethereum or as a special purpose cryptocurrency.

In some example embodiments, the client's TAB is decreased upon every resource access or upon a specified number of resource accesses. The account balance may be decreased whether an access request or series of access requests are successful or unsuccessful. The updated TAB information is shared with stakeholders via the distributed trust ledger. If a client does not have a sufficient level of trust, as determined from their TAB, required for a particular resource access request, a resource access request is denied by a relying party.

In other example embodiments, the client can trade one or more units of their TAB, i.e. one or more trust facets or trust tuples, for a specified number of resource accesses. For example, a client can trade one unit from their TAB for 1000 accesses to a specific resource. Each time the client accesses the specific resource, the number of accesses remaining is decremented until the client has no remaining accesses, at which point the client must trade additional unit(s) of TAB for further accesses.

Trust account balance can be used by participants in the Trust Broker System as a measure of trust, either as a discreet value or on a continuum. Relying parties and/or stakeholder services can track multiple successful access requests with one or more user sessions to establish and increase specific trust levels over time. Trust account balance encoded in the distributed trust ledger can thus be used as an alternative way to track user and device reputation. For example, a client's TAB may be mapped to a trust score that is analogous to a credit score. In a particular example, a trust account balance ranging from 0-1000 units of trust may be mapped to a corresponding trust score from 0-100%.

Example Aggregate Decisions to Authorize Specific Resource Requests:

In some example embodiments, the data elements representing trust include trust facets, for example facets that represent aspects of trust in a user, device, or client which can be included in an account associated with a client. One or more trust broker system participants may add trust facets to a client's account by encoding the trust facets in blocks of the distributed ledger to indicate an increase in trust for a particular user, device, or client. For example, a host check module operating on a client device can add, to the distributed trust ledger, trust facets representing results of a host check operation such as, for example, an indication that an operating system patch has been applied, that anti-virus software and virus definitions are present and up-to-date on a client device, and that a successful anti-virus scan has been completed within an amount of time. Trust facets can include information added to the distributed trust ledger by a third-party participant in a Trust Broker System. For example, an external HIPAA assessor can add a HIPAA trust facet or value to a client's trust account. When a client makes an access request, a relying party can access the distributed ledger to check trust facets that are included in the client's account and can make an access decision based on trust facets that are present or not present in the client's account. Examples of granular access decisions can include determining both sufficient quantities (i.e. sufficient TAB) and sufficient types of trust facets are present in a client trust account. Trust-facets or tuples can be private to specific applications, resources or trust assessors, or can be shared/common across groups thereof.

In an embodiment, a client may be required to assemble a plurality of trust facets of one or more types, each of which may be provided by a different party, to access a particular resource. Examples of using one or more of trust facet types and a TAB in an aggregate decision to authorize a specific resource request include an application/resource may deny access after N accesses, until the trust account balance is replenished. A health-care or medical application may deny access to a particular client until an external HIPAA assessor has added or updated a HIPAA trust-facet in the client's account. Meanwhile financial or marketing applications may grant access regardless of whether the client's account includes a HIPAA trust facet, provided the client's account otherwise includes specific trust facets and/or TAB required to access the financial or marketing applications. An application may determine access authorization based on a combination of a plurality of different trust facets that are added to a client's Blockchain account by an identity service (e.g. Okta/Ping-Identity service), a corporate directory based authentication, a virus scan completion, a host and patch level compliance check, a reputation score for the user from an external service (incl. public service access), a resource request transaction per-hour/per-day/per-week accounting across multiple secure applications, etc. A resource may determine an access decision using factors including a user+device behavioral assessment score (or set of scores) that is based on patterns of access to protected resources by the user over a specific period (weeks, months) of time. The trust score may increase over time as long as behavior falls within "established" normal patterns. A resource may determine an access decision using factors including user or client access analysis (e.g. resource request counts for twenty-four hour period) by third party firewalls that is posted in the TAB by the respective firewall providers.

8 Table 1 below is a table illustrating example trust facets according to aspects of the disclosure.

TABLE 1

| Trust Facet | Added/Removed/Adjusted By |
|---|---|
| Trust account balance (TAB) value | Value of TAB can be modified by Trust Assessor, IDP, relying party, and other participants |
| Trust tuple representing authorization response from IDP; IDP makes authorization decision based on credentials and HCR from client | Appended to BC by the IDP |
| Host check results | Added by client after performing host check |
| Okta/Pin-Identity service trust facet | Okta/Pin-Identity service |
| HIPAA trust-facet (or value) | Added (or updated) by an external HIPAA assessor |
| Trust facet representing corporate Directory-based authentication | Corporate Directory-based authentication |
| Trust facet indicating a virus scan completion for example, by a specified anti-virus software (e.g. by Symantec, McAfee, Karpersky) | Added by virus scan software or by host checker that determines virus scan has been successfully completed |
| Trust facet indicating a host and patch level compliance check | Host check software, for example Pulse Secure Host Checker |

TABLE 1-continued

| Trust Facet | Added/Removed/Adjusted By |
|---|---|
| Trust facet indicating a reputation score for the user | Added by an external service, including public service access; Trust Assessor; Relying party; $3^{rd}$ party reputation tracker |
| Accounting of transactions per time period (e.g. per hour, day, or week) across multiple secure applications | Added to BC by relying party/resource |
| Trust facet value representing a client behavioral assessment score or set of scores based on patterns of resource access over time. | Added to BC by relying party or by Trust Assessor that tracks client behavior. The value can be increased over time if client behavior falls with established normal patterns. |
| Trust facet value representing user access analysis (e.g. resource access counts per time period, e.g. 24 hours; time since last successful access) User Device Client device type Application attributes (client application type) Application reputation Access context | Added to BC by third party firewall provider. |

A Trust Broker System stores multi-faceted trust as a units of trust facet or as trust tuples, where each tuple includes a plurality of trust facets, encoded in blocks of a permissioned blockchain-based distributed trust ledger which is accessible to system participants. Access to the permissioned distributed trust ledger is restricted to a limited set of known participating Trust Broker System nodes. The set can be limited to a single customer instance, a single multi-tenant managed instance, a single Software as a Service (SaaS) instance or span across all of the above. The distributed trust ledger is accessible and observable by multiple independent providers and consumers of trust, including services and third parties. No explicit trust relationship is required amongst the services and third parties since the distributed trust ledger is based on the consensus of participating nodes. This eliminates the need for clients to bear the trust (e.g., in the form of bearer tokens, session cookies or otherwise) and/or specific upfront established authorization.

Trust account balance (TAB) may correspond to one or more facets of trust including, for example, user, device, and application attributes and reputations (e.g., user reputation, client application, client device type) as well as access context (e.g., access frequency and time since last successful access). Stakeholders can increase, decrease, and validate TAB, including individual trust facets, across time, location, and relying party dimensions.

The decentralized Trust Broker System includes multiple independent participants that establish, enhance, validate and/or revoke the multi-faceted TAB. Multiple system components and services as well as independent services (stakeholders) can each observe and/or establish one or more facets of trust over time. The Trust Broker System can be made open to multiple vendors as well as across multiple customers that, based on partnerships, share users. The blockchain-based user account multi-faceted trust balances can be shared and updated by different vendors and customers independently, without requiring any of the vendors to be the singular central trusted authority. The Trust Broker System distributed ledger, which spans multiple customers or customer segments, provides a higher level of consensus across a broader set of Trust Broker System participants and corresponding Blockchain nodes; i.e. it lowers the chances that a rogue actor would be able to change the trust transactions.

The Trust Broker System participants can share and exchange consensus-based trust information and collaboratively increase and decrease a value or magnitude of TAB, and corresponding levels of trust and trust-relevant context information, associated with users as well as with client-application and client-device combinations. The decentralized distributed trust ledger supports dynamic adjustments of trust attributes within and across user/device sessions. For example, trust facets/values recorded in the distributed trust ledger can be adjusted dynamically within a session. All relying parties and stakeholders get updated views of a client's trust posture, via the updated distributed trust ledger, without having to go to a central authority to revalidate.

Trust account balance of the Trust Broker System is thus dynamic rather than static or a one-time measure of trust. As in real life, trust relationships are established & increased over time, while different activities or non-activities would reduce or diminish different trust facets.

When unused, a trust-facet specific account balance can decrease or expire and would need to be refreshed or replenished prior to a next resource access. For example, device compliance checks may be considered stale after 24 hrs or a week and must be repeated as necessary.

The TAB is used to provide secure access to a plurality of applications and other resources. A trust account balance is maintained in the permissioned distributed trust ledger for each client participating in the Trust Broker System. A client can access a digital wallet representing the client's trust account balance using an access ID and authorization credential such as a token. The client can use or exchange portions of the multi-valued trust account balance to perform specific resource access requests. In a particular example implementation, a client transfers a number of the trust facets including its trust account balance to a relying party to gain access to applications, services, and resources. In additional example implementations, different facets or elements of the trust balance can be carried over from one user session to subsequent sessions.

Judgements of trust, i.e., authorization of granular service requests, are made by relying parties downstream of the generation of multiple facets of trust by Trust Broker System participants rather than converting the multiple facets of trust into a single trust decision. In this manner, the Trust Broker System advantageously provides a decentralized multi-faceted, multi-valued trust system that can be assessed, just-in-time relative to resource request sequences and locally to the relying party.

Some example embodiments of the Trust Broker System include a trust assessor, which is configured to monitor activities of clients and activities of other system participants and to increase and decrease trust balances corresponding to the clients accordingly. With the addition of the trust assessor, trust assessment and trust evaluation is not required to be an upfront function of an Identity or AAA service, but can be incorporated in the decentralized Trust Broker System model at enforcement points and relying parties. Trust and reputation management and sharing is available as a decentralized and distributed service capability. In addition, multiple independent trust assessors or reputation services can contribute to and participate in the system without requiring a central authority.

The trust assessor may observe or otherwise obtain information regarding a client's behavior, for example by receiving a report of access behavior from a resource provider. The trust assessor may update a client's TAB based on client behavior, for example by increasing TAB in response to a pattern of normal or authorized accesses or by decreasing TAB in response to a pattern indicating unauthorized accesses or unusual behavior. In an example embodiment, the trust assessor may monitor trust balances associated with clients. For example, the trust assessor may periodically query a client's account to determine a client's current TAB. The trust assessor may query a client's TAB in response to learning, either from the client or from a resource provider, that an access attempt by the client has been unsuccessful.

The trust assessor may recognize when a client's TAB is below a threshold level, for example when a client's TAB is insufficient to successfully complete an access request. In response to determining that a client's TAB is below the threshold, the trust assessor may prompt the client to perform an action to increase the client's TAB, for example the trust assessor may prompt the client to perform a host check which, if successful, may result in an increase in the client's TAB.

In a further example embodiment, the trust assessor can include a trained predictive model, for example a machine learning model trained on feature vectors that may include, for example a client's access history, historical TAB, historical specific trust facets or trust tuples, and historical access decisions. The trust assessor can use the trained predictive model to process inputs, for example a client's current TAB and specific trust facets and generate predictions including a predicted values of TAB and/or predicted specific trust facets that are likely to be required for future access attempts by the client. For example, the trust assessor may determine that, based on historical behavior, a client is likely to submit an access request a HIPPA resource provider and that the access request will not be successful if the client's trust account does not include a HIPPA trust facet. The trust assessor may prompt the client to obtain a sufficient TAB and required trust facets for an access attempt that is predicted by the trust assessor.

Example Trust Broker System

FIG. 1 is a block diagram illustrating a Trust Broker System 1000, in accordance with one or more techniques of this disclosure. The Trust Broker System includes multiple participants or stakeholders (1100, 1200, 1300, and 1400) which each include one or more blockchain nodes (1120, 1220, 1440, 1360, and 1370) which include blockchain clients and blockchain explorers. In some examples, a blockchain client represents primary participating nodes in the blockchain that perform transactions to establish or acquire trust and/or use their trust "balance" to acquired access authorization to Applications, Services and their resources. In some examples, a blockchain explorer represents a blockchain participating node that has a copy of the ledger, but uses it primarily for read-only reference. I.e. unlike a regular BC-client an Explorer would not initiate transactions. In some example embodiments the trust broker system further includes trust assessor (1500). Trust assessor (1500) includes blockchain client (1520). The blockchain nodes are configured to access a permissioned blockchain-based distributed trust ledger including multi-faceted trust value. Each blockchain node is communicatively coupled to each other blockchain node, thereby enabling sharing of the distributed trust ledger among all blockchain nodes.

The Trust Broker system includes client device (1200) which can interact with an application/service provider that acts as a relying party (1400). Client device (1200) includes one or more client applications (1240). Relying party (1400) includes one or more applications, services, and resources (1440). A user (1250) of the client device can execute client applications to securely access applications, services, and their resources (1440) of relying party (1400). Client device (1200) includes a host check module (1260) which is operable to execute host compliance check operations on the client device. The host check module is configurable, for example by system policy or by an administrator or user, to perform one or more host check operations including, for example, checking that a successful antivirus scan was performed within a configurable preceding time interval, checking that virus definition files are no older than a configurable amount of time, check that specific anti-malware software is installed, and check for specified Windows operating systems and minimum service pack versions. An example host check module is the Pulse Secure Host Checker, which is configurable to perform one or more client device health and security checks and to generate reports that include results of the health and security checks.

The Trust Broker System also includes an identity service or broker (1100), for example an identity provider (IdP), which is configured to perform actions to determine authentication status of clients and to add trust, for example trust facets and trust tuples including multiple facets, to client accounts encoded in the distributed trust ledger. Additional embodiments of the Trust Broker System include multiple trust facet providing participants, each configured to determine aspects and/or behaviors of clients related to trust and add or remove trust to client accounts. Trust facet providing participants include, for example, a Health Insurance Portability and Accountability Act (HIPAA) assessor that is configured to assess a client's compliance with HIPAA regulations and to provide a HIPAA trust facet to clients that are in compliance.

Blockchain miners (1360, 1370) each include a copy if the distributed trust ledger (e.g., 1324). The blockchain miners are configured to aggregate transactions on the distributed trust ledger and to perform Proof-Of-Work to validate a block of transactions that can be added to the tail of the blockchain based on consensus across all blockchain miners. Consensus algorithms used by the blockchain miners include, for example, Proof-Of-Work (PoWork), Proof-Of-Stake (PoStake) and Proof-Of-Time (PoTime). Although two blockchain miners (1360, 1370) are shown, a trust broker system can typically include many more blockchain miners. In some examples, a blockchain miner represents workers of the Blockchain that aggregate transactions on the distributed ledger and perform a so-called Proof-Of-Work to validate a block of transactions that can be added to the tail of the chain based on consensus across all Miners.

The client device, identity service/broker and trust assessor each include a blockchain client (1120, 1220, 1520). Each blockchain client (1120, 1220, 1520) includes a copy of the distributed trust ledger (1124, 1224, 1524) and can include one or more smart contracts (1122, 1222, 1522). The distributed trust ledger contains the chain of transaction blocks that have been confirmed through blockchain miner consensus, as well as transactions that are in the pipeline to be confirmed. Smart contracts are associated with transactions of the blockchain trust (e.g., transactions to exchange TAB value for access to services). Smart contracts are based on a computerized transaction protocol that executes the terms of a contract. A Blockchain virtual machine (not shown) provides a virtual execution environment for the blockchain client nodes that can initiate transactions as well as execute smart contracts. In some examples, a smart contract is based on a computerized transaction protocol that executes the terms of a contract that is associated with transactions of the Blockchain currency (e.g. exchange value for goods or services).

Blockchain clients are the primary participating nodes in the Trust Broker System. Blockchain clients are configured to execute smart contracts (1122, 1222, 1522) to perform transactions to establish or acquire a balance of trust, to add and remove trust to and from the distributed trust ledger, and to exchange trust between accounts corresponding to clients and other Trust Broker System participants. For example, if blockchain client (1222) on client device (1200) determines that a trust balance associated with user (1250) should be increased, blockchain client (1222) can execute a smart contract to initiate a compliance check or other action that will result in an increase in trust for the client. On other supplement services (not shown) smart contracts can be used to adjust and/or re-assess the different facets of a user's or clients trust levels.

Blockchain client (1220) on client device (1200) is the equivalent of a Blockchain wallet. Client device blockchain client (1220) can check a trust account balance associated with user (1250) and provide and access token to the user, for use in accessing resources of relying party (1400) if the balance is sufficient.

Relying party (1400) includes blockchain explorer, which includes a copy of the distributed trust ledger (1424) and can include one or more smart contracts (1422). Blockchain explorer (1400) is a Trust Broker System participating node that primarily uses its copy of distributed ledger (1424) as a read only reference to determine whether a particular client is in possession of sufficient trust for a successful resource access request. In an alternative embodiment (not shown) relying party (1400) can include a full blockchain client (similar to blockchain client (1120) for example) which can execute smart contracts to perform transactions to modify (increase or decrease) one or more facets of trust associated with a specific account.

Trust assessor (1500) includes blockchain client (1520) which includes a copy of the distributed trust ledger (1524) and can include one or more smart contracts (1522). Trust assessor (1500) includes assessor module (1540) which can include one or more processes operating to carry out functions related to trust assessor roles. In an example embodiment, trust assessor (1500) can fulfill two roles: trust account balance checker and trust account balance adjustment. The trust assessor carries out account trust account balance checker functions by monitoring client trust account balances, for example by causing an assessor blockchain client to check the distributed trust ledger for a TAB value corresponding to a particular user or client. The assessor blockchain client provides client trust account balance information to assessor module (1540). The trust assessor carries out trust account balance adjustment functions by executing one or smart contracts to add, to the distributed trust ledger, requirements that a particular user or client perform specified actions to add one or more trust facets or trust tuples to their trust account. For example, the trust assessor can add a requirement that a client device perform causes a host checker module to perform a host check operating and add results of the host check, e.g., one or more trust facets generated by the host checker module, to the distributed trust ledger, provide host check results to an IdP when requesting a authentication from the IdP, or both add the host check results to the distributed trust ledger and use the host check results to request and authentication from an IdP service. In another example, the trust assessor adds, to the distributed trust ledger, a requirement that a client obtain specific trust facet or type of trust facet from a specific trust broker system participant, for example from a third party assessor such as a HIPAA assessor or from a third party firewall or antivirus software application.

In some embodiments functions of two or more Trust Broker System participants can be combined. For example, relying party (1400) can fulfill the role of trust assessor (1500) for required TAB or required specific trust facets associated with the specific resources that the relying party represents.

In further embodiments (not shown) the Trust Broker System can include one or more additional clients, client devices, identity services or brokers, and relying parties. A larger set of Trust Broker System participants will, in principle, provide a wider base for trust consensus, whereby the cumulative group of blockchain miners (e.g., 1360, 1370) can be smaller.

An example operating method for authenticating a user/client and providing access to a protected resource is described herein. For example, an operating method of Trust Broker System (1000) is illustrated in FIGS. 2, 3A, 3B, and 3C.

Figure 2:
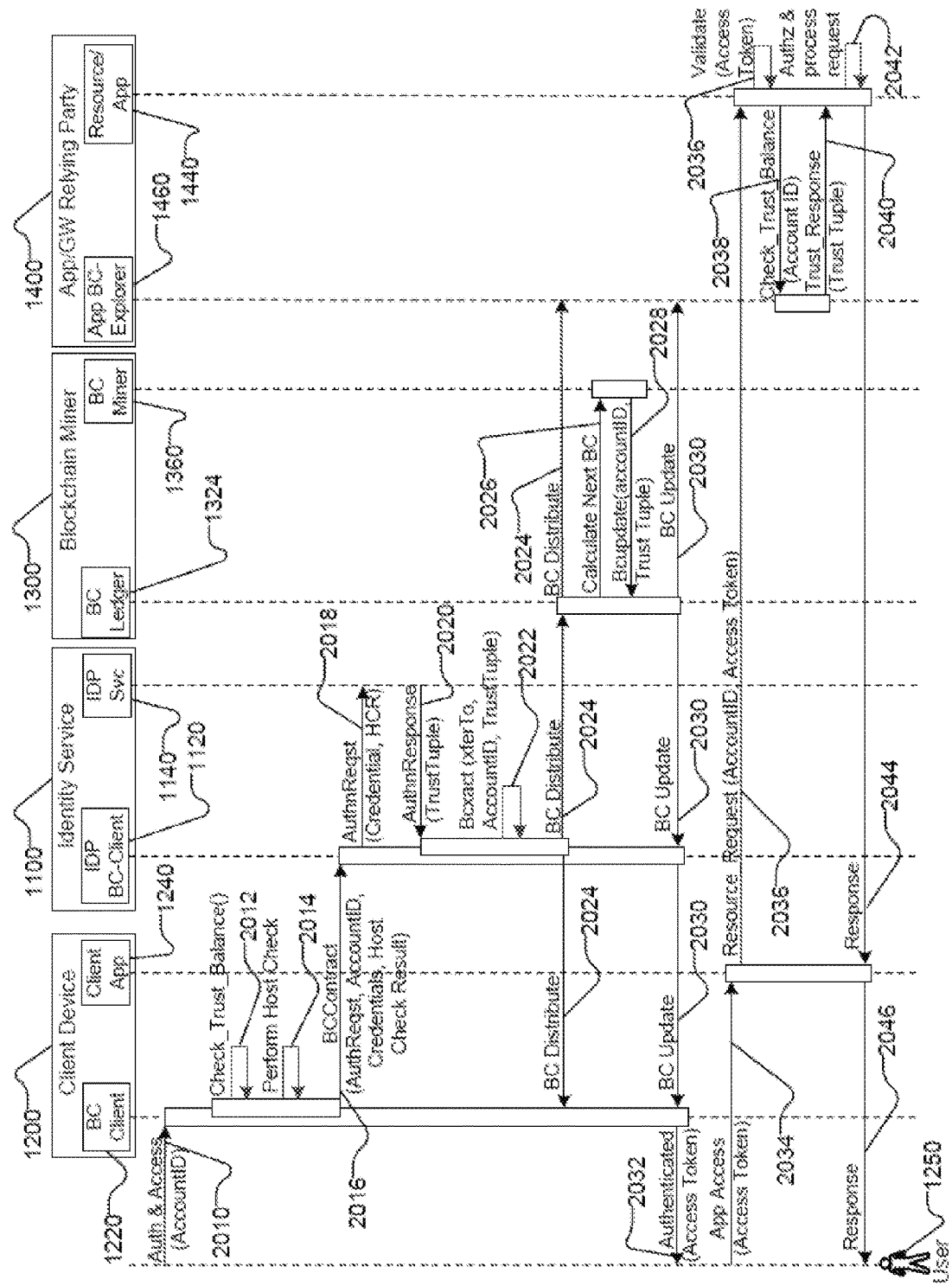
FIG. 2 is a flow diagram illustrating a first information flow between the system participants and blockchain nodes illustrated in FIG. 1 for making a trust-based resource access decision, in accordance with one or more techniques of this disclosure.

FIG. 2 is a flow diagram illustrating a first information flow between the system participants and blockchain nodes illustrated in FIG. 1 for making a trust-based resource access decision, in accordance with one or more techniques of this disclosure. At block (2010) a user (1250) authenticates with blockchain client (1220) of client device (1200), which is equivalent to authenticating with a Blockchain wallet, to check the user's current trust account balance. At block (2012) blockchain client (1220) checks the user's account Trust account balance (TAB) and determines that the user's TAB does not include a sufficient number of trust facets or trust tuples. The blockchain client (1220) causes a host check module (1260) on the client device to perform a host compliance check (2014), the results of which can be used to update the user's trust account balance. At block (2016) the client device blockchain client (1220) executes a smart contract with IDP blockchain client (1120) to authenticate the user (1250) and client device (1200) pair with the IPD service (1140). The smart contract includes an authentication request, the user's account ID, user credentials, and the results of the host compliance check.

At block (2018) the IdP blockchain client (1120) communicates an authentication request to the IdP service (1140). The authentication request includes the user credentials and host compliance check results. The IdP service (1140) determines whether or not to authenticate the user based on the credentials and the results of the host check. For example, the IDP service authenticate the user if the user credentials match a user that is registered with the Trust Broker System and the host check results indicate that the client device (1200) is compliant with system or network policy. Upon successful authentication, at block (2020) the IdP service provides an authentication response to the IdP blockchain client (1120). The authentication response includes a trust tuple representing multiple facets of trust. At block (2022), the IdP blockchain client (1120) executes a smart contract to initiate a blockchain trust balance update transaction to add the trust tuple to the user's account. Adding the trust tuple to the user's account increases the user's TAB. In an example embodiment (not shown) the IdP service also provides a secure access token to the IdP blockchain client and the IdP blockchain client embeds the secure access token in the distributed trust ledger using the same or a different smart contract. In a further embodiment, the IdP service provides a secure access token directly to the client.

At block (2024) the IdP blockchain client distributes the trust balance update transaction, including the added trust tuple and, if present, a secure access token, across copies of the distributed trust ledger (1124, 1224, 1424, and 1324) residing on each of the client device (1200), blockchain miners (1300), and relying party (1400). At block (2026) blockchain miners (e.g. 1360) run the trust balance update transaction through their consensus algorithms to add the transaction to the distributed trust ledger blockchain. When consensus is reached among the blockchain miners, the miners, at block (2028), update the blockchain-based distributed trust ledger (1324) and distribute, at block (2030) the updated ledger is to blockchain clients (1220, 1120, 1440).

If the client device blockchain client (1220) determines, based on the updated ledger, that an account associated with the user includes sufficient TAB, then at block (2032) it provides the user with an access token that is securely retrieved from the user's blockchain account or from the identity service/broker (1100). An access token that identifies user and client device can be embedded in the distributed trust ledger blockchain itself or be provided to the relying party out-of-band.

At block (2034) the user initiates an application resource request, via client application (1240), using the access token. At block (2036), client application (1240) transmits the resource request, including the access token and the account ID associated with the client's trust account, to the relying party resource/application (1440). In additional embodiments, other forms or mechanisms can be used to securely provide an access-token from the user/client to the relying party (to prove the specific trust account belongs to the requestor).

The resource/application validates the access token (2036) and then, at block (2038), sends a check trust balance request to the relying party blockchain explorer (1460) or blockchain client (not shown) to check the user's trust account balance recorded on the distributed trust ledger. At block (2040) the relying party blockchain explorer sends a response message to the relaying party resource/application (1440). The response message includes a value of the user's TAB, for example in the form of a TAB value or a number of trust tuples in the user's account. If the value of the user's TAB is sufficient, then at block (2042) the relying party resource/application (1440) authorizes and processes the resource request and, at block (2044), provides a response/result to the client application (1240). At block (2046) the client application provides results of the response to the user (1250), for example by presenting a resource included in the response to the user.

Figure 3A:
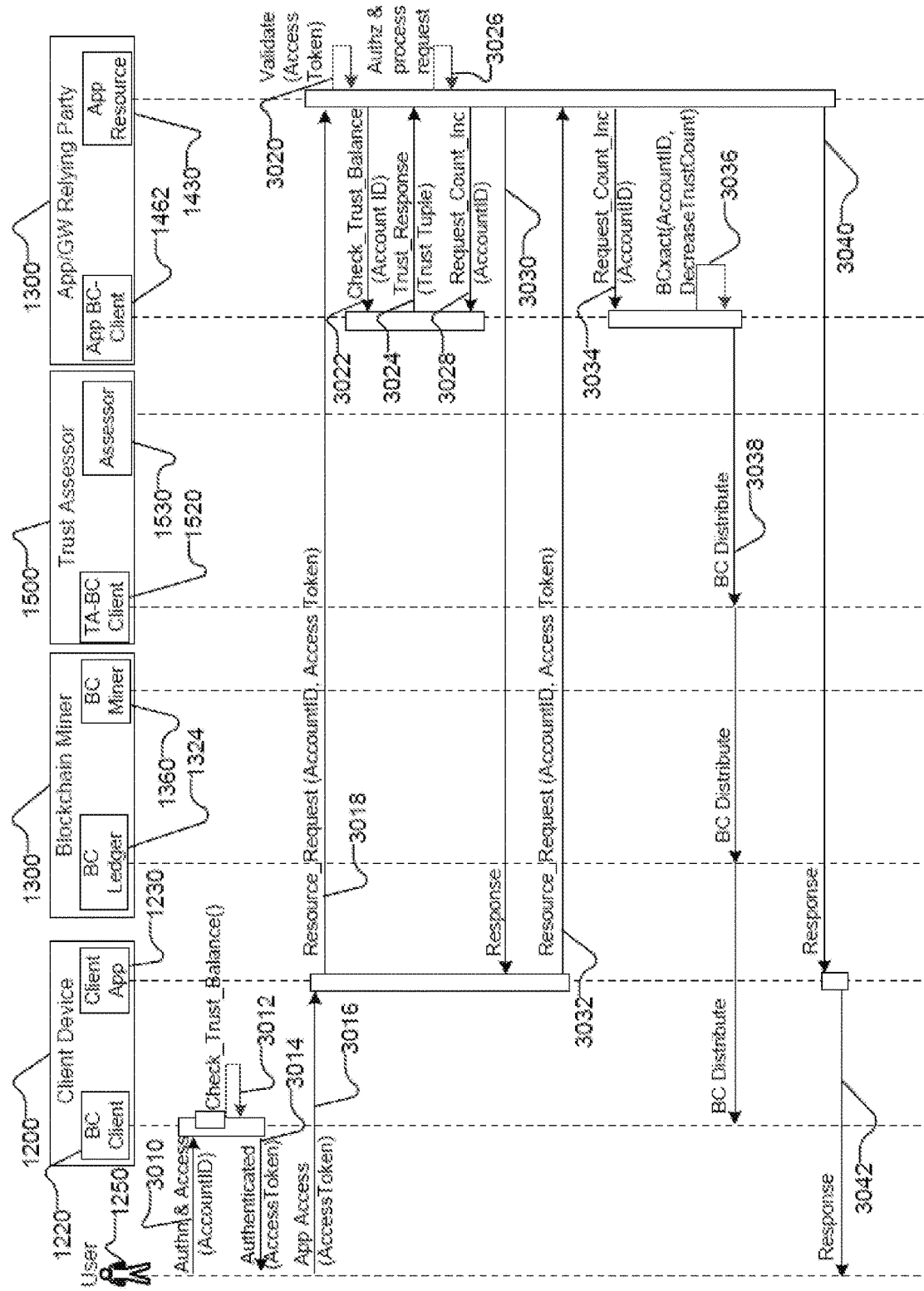
FIG. 3A is a flow diagram illustrating an example operation of controlling access to an application, in accordance with one or more techniques of this disclosure.
Figure 3B:
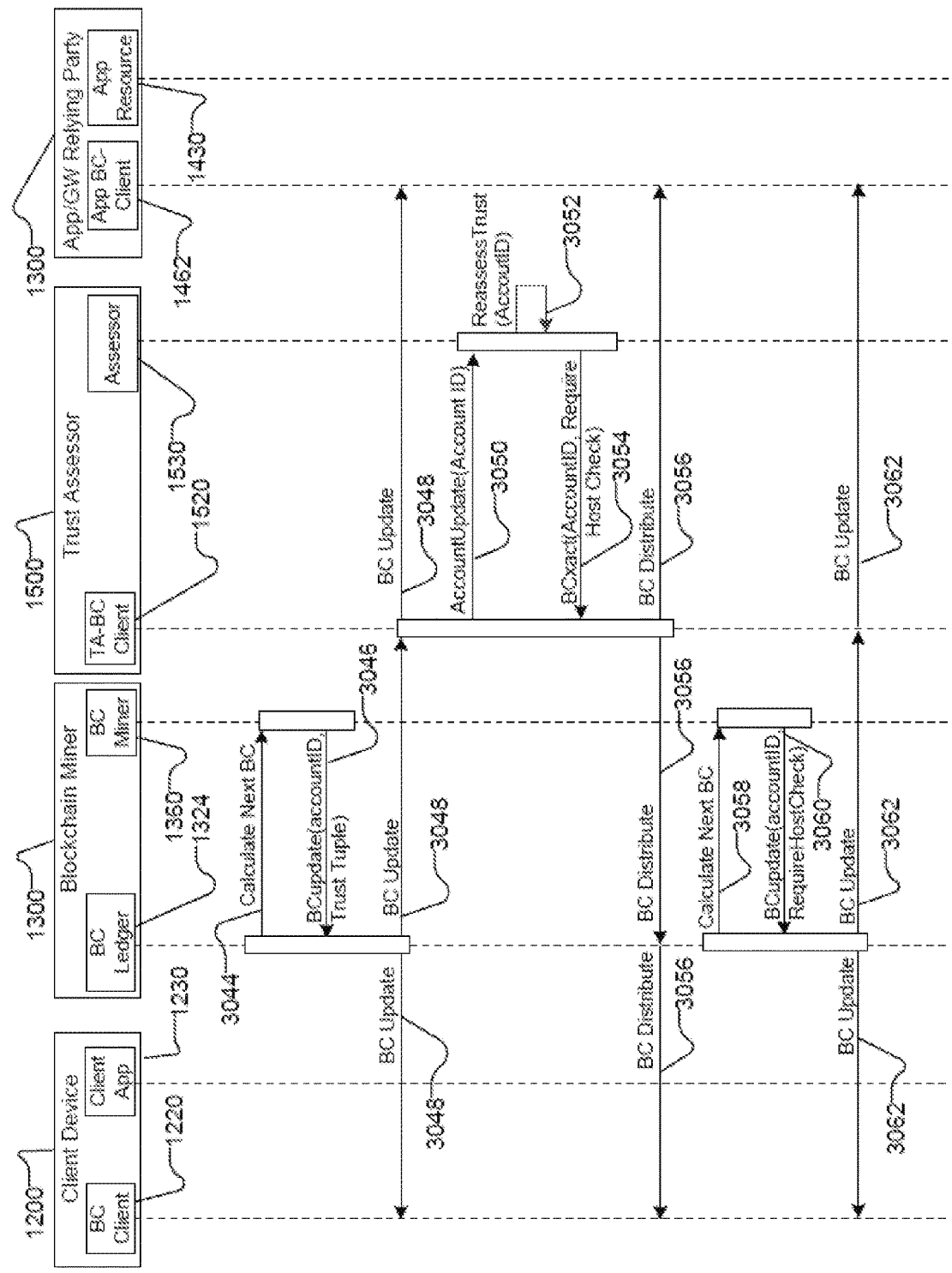
FIG. 3B is a flow diagram illustrating an example operation for determining a trust account balance, in accordance with one or more techniques of this disclosure.
Figure 3C:
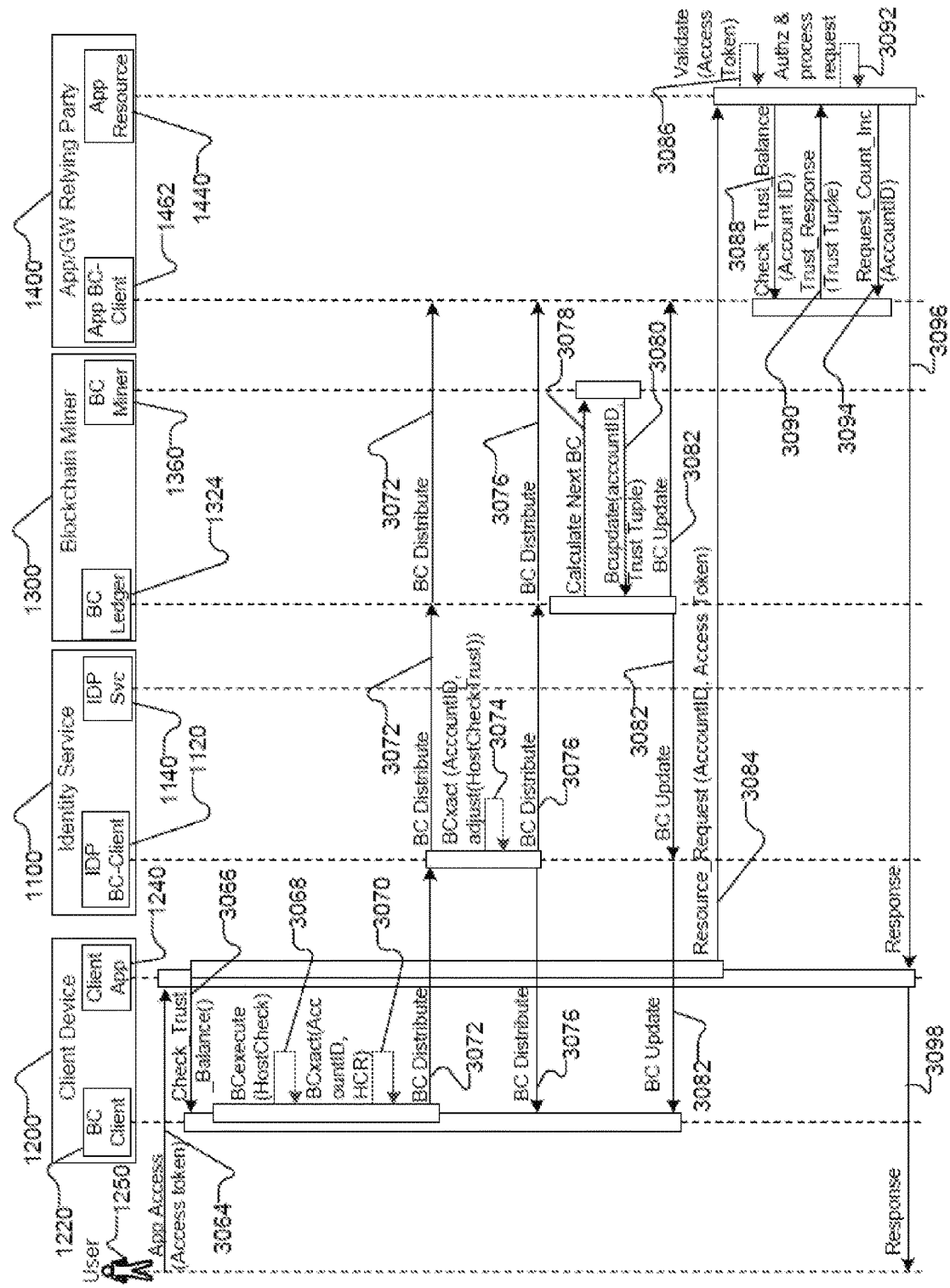
FIG. 3C is a block diagram illustrating an example operation for controlling access to an application and determining a trust account balance, in accordance with one or more techniques of this disclosure.

Example operating method for tracking access resource counts, updating trust balances, and providing access to protected resources FIGS. 3A-3C include respective flow diagrams illustrating a second information flow between system participants and blockchain nodes illustrated in FIG. 1 for making trust-based resource access decisions and for adjusting trust balances. For example, communications between and operations carried out by components of the Trust Broker System while implementing an example trust assessor operating method are illustrated. In the illustrated method, relying party (1400) includes a blockchain client (1462) which is configured to execute smart contracts as well as check the distributed trust ledger.

FIG. 3A is a flow diagram illustrating an example operation of controlling access to an application, in accordance with one or more techniques of this disclosure. At block (3010) user (1250) authenticates with their account on client device (1200) by interacting with client device blockchain client (1220). The client device blockchain client checks the trust account balance (3012) in the user's account and, if the balance is sufficient, authorizes access to the resource/application by providing an access token to the client (user/device pair) (3014). At block (3016) the user requests access to a resource/application (1440) of relying party (1400) via client device client application (1240). At block (3018) the client application transmits a resource request, including the user's account ID and the access token, to the resource/application (1440). At block (3020), the application/resource begins an access decision determination by validating the access token. After validating the access token, the application/resource requests, at block (3022), a check of the users trust account balance (TAB) from the relying party blockchain client (1462). The relying party blockchain client responds with the value of the user's TAB at block (3024). If the user's TAB is sufficient to allow access, the application/resource authorizes and processes the request at block (3026).

For every access event from the client, the relying party (1400) increments an access count by transmitting an access count increment message from resource/application (1440) to relying party blockchain client (1462). At block (3028) the application/resource communicates with the relying party blockchain client (1462) to increase the access count, and at block (3030) communicates an access response to the client application (1230). At block (3032) the client application (1240) makes a second resource request to the application/resource (1440). The application/resource further increments the access count at block (3034) and communicates a second response to the client application at block (3040). At block (3042) the client application provides access responses from the application/resource (1430) to the user (1250).

The client is associated with a configurable threshold number (n) of access attempts which corresponds to the number of times that the client is trusted to access resource/application (1440) before a trust reassessment is required. Each time the application/resource increases the access event count (3028, 3034), the relying party blockchain client (1462) compares the current access count to the threshold (n). When the threshold number (n) of access events have been counted by the relying party (1400), relying party blockchain client (1462) executes a smart contract (3036) to decrease a trust account balance (TAB) associated with the client, for example by decreasing the number of trust facets or trust tuples associated with the user's account. At block (3038), the relying party blockchain client distributes the TAB decrease transaction to copies of the distributed trust ledger on Trust Broker System participants (1200, 1300, 1500).

FIG. 3B is a flow diagram illustrating an example operation for determining a trust account balance, in accordance with one or more techniques of this disclosure. At block (3044) the blockchain miners (e.g. 1360) perform calculations using a consensus algorithm to add the TAB decrease transaction that was distributed by the relying party in block (3038) to the next block of the blockchain-based distributed trust ledger. At block (3046) the blockchain miners execute a smart contract to update the distributed trust ledger blockchain by appending the next block, including the TAB decrease transaction associated with the user's account ID, to blockchain. At block (3048) the blockchain miners distribute the updated blockchain to Trust Broker System stakeholders, including client device (1200), trust assessor (1500), and relying party (1300).

The trust assessor (1500) monitors the blockchain-based distributed trust ledger. The trust assessor can recognize decreases in TAB associated with a particular client or user and through a smart contract or other means request or initiate a reassessment of trust in the client, user, or user device to increase the client or user's TAB. At block (3050) the trust assessor blockchain client (3050) informs the assessor module (1530) that the TAB associated with the user's ID has been updated by the BC update received from the blockchain miners at block (3048).

At block (3052) the assessor reassesses the TAB associated with the user's ID, for example by comparing updated TAB value to a threshold value and determining that the user's TAB should be increased if it's value less than the threshold value. If the assessor determines that the user's TAB should be increased, it executes a smart contact at block (3054) to add a requirement to the distributed trust ledger, linked to the user's account ID, that a host check should be performed. The trust assessor blockchain client distributes (3056) the requirement to other Trust Broker System stakeholders, including blockchain miner (1300). Blockchain miners (e.g., 1360) perform calculations to add the host check requirement to the next block of the distributed trust ledger blockchain at block (3058) and execute a smart contract to append the block to the distributed trust ledger blockchain at block (3060). The blockchain miner (1300) distributes the updated distributed trust ledger to other Trust Broker System stakeholders, including client device blockchain client (1220) at block (3062).

FIG. 3C is a block diagram illustrating an example operation for controlling access to an application and determining a trust account balance, in accordance with one or more techniques of this disclosure. At block (3064) user (1250) attempts to access a protected application or resource (1440) by communicating an application access request to client application (1240). When making the access request, the user presents an access token, for example and referring to FIG. 3A, an access token received by the user at block (3014). Upon receiving the access request from the user, the client application (3066) queries the client device blockchain client (1220) at block (3066) to check the user's TAB. The client device blockchain client checks the distributed trust ledger and determines that the ledger includes the host check requirement that was added by the trust assessor (1500). At block (3068) the client device blockchain client (1220) executes a first smart contract to cause client device host check module (1260) to perform a host check operation and at block (3070) executes a second smart contract to add the results of the host check operation to the distributed trust ledger. The client device blockchain client distributes the host check results to other Trust Broker System stakeholders, including identity service (1100), at block (3072).

At block (3074) the IdP blockchain client (1120) executes a smart contract to adjust the TAB associated with the user's account ID based on the host check results, for example by adding a trust tuple specific to host check results to the distributed trust ledger. At block (3076) the IdP blockchain client distributes the TAB update to other Trust Broker System stakeholders, including blockchain miner (1300). Blockchain miners (e.g. 1360) calculate the next block of the distributed trust ledger at block (3078) and append the block, including the host check-specific trust tuple, to the distributed trust ledger blockchain at block (3080). The blockchain miner distributes the updated blockchain to system stakeholders, including client device (1200) and relying party (1400) at block (3082).

After the distributed trust ledger is updated with increased TAB for the user's account, the client application (1240) sends a resource request, including the access token, to the relying party application/resource (1440) at block (3084). The application/resource validates the access token (3086), checks the user's TAB (3088, 3090) and if the TAB is sufficient, authorizes and processes the request (3092) and increments the user's request count (3094). At block (3096) the application/resource (1440) sends a response to the client device client application (1240) which presents data included in the response to the user at block (3098).

Alternative sequences and models of trust assessment can be established based on one or more facets of trust that span one or more users, clients, client devices, resources/applications and/or resource/information types. Different Trust-Assessor models can be incorporated that focus on different models of trust: straight access accounting, time-based or time-limited access, behavioral patterns, behavioral anti-patterns, elevated or reduced threat levels, etc.

Figure 4:
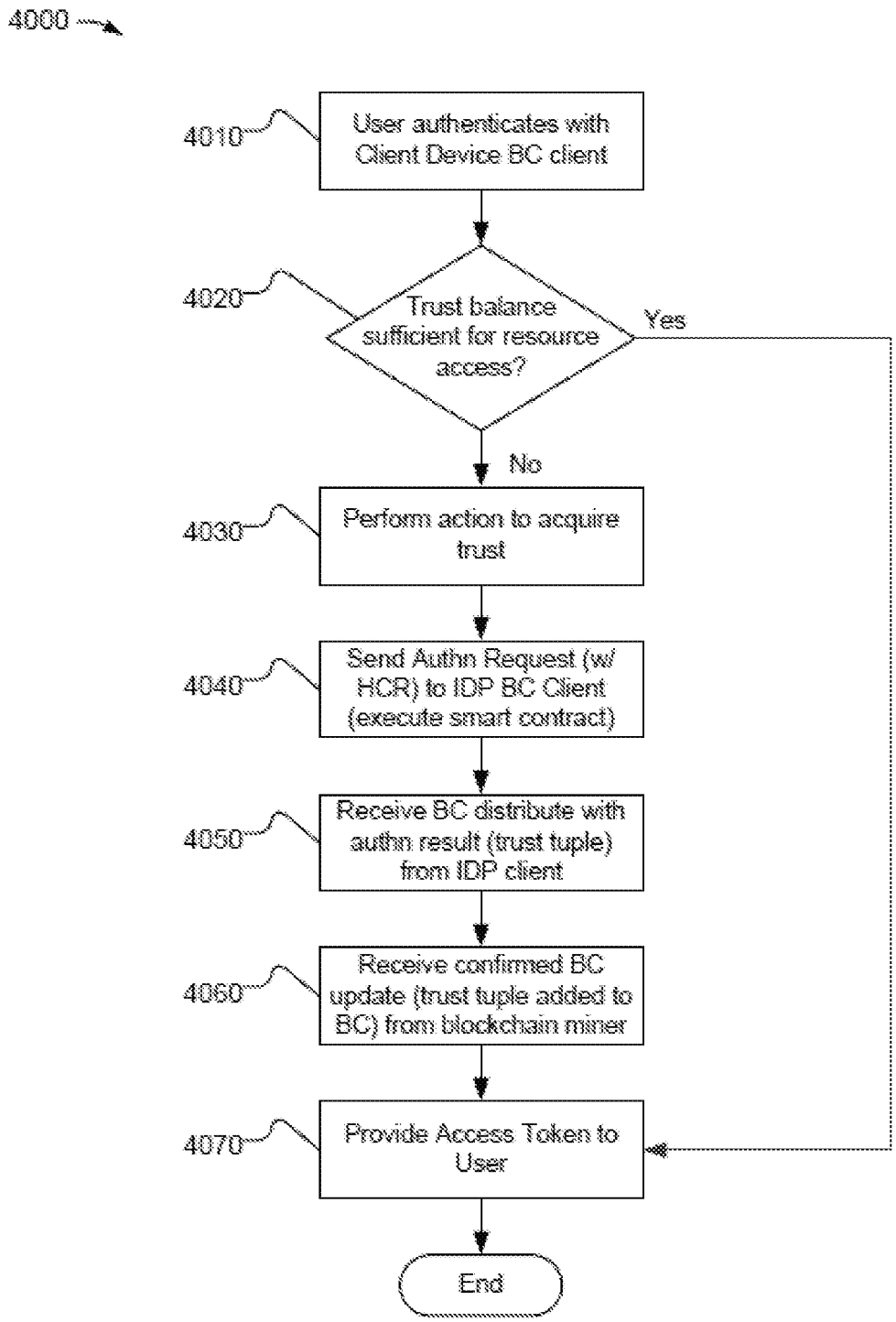
FIG. 4 is a flow diagram illustrating an example operation performed by a client device and a client device blockchain client for an initial authentication with the client device, in accordance with one or more techniques of this disclosure.

Example operating methods carried out by Trust Broker System components Client device trust account access FIG. 4 is a flow diagram illustrating an example operation (4000) performed by client device (1200) and client device blockchain client (1220) when a user initially authenticates with the client device (e.g., at block (2010) of FIG. 2 or block (3010) of FIG. 3A), in accordance with one or more techniques of this disclosure. At block (4010) a user authenticates with the client device blockchain client, for example by providing a distributed trust ledger account ID associated with the user and access credentials such as a password for the account. At block (4020) the client device blockchain client determines whether the user's trust account includes sufficient trust account balance (TAB) for performing one or more successful resource access attempts. In an example embodiment the client device blockchain client compares a current value of the user's TAB to a threshold value required for a particular resource access. In an example embodiment, the client device blockchain client determines whether the user's trust account includes one or more specific trust facets required for resource access, e.g., as specified by one or more enterprise policies. For example, the client device blockchain client can determine whether or not the user's trust account includes a trust facet indicating a recent successful anti-virus scan or a trust facet indicating that the client device operating system is properly patched. If the client device blockchain client determines that the user's trust account includes a sufficient TAB level and/or required trust facets, the process proceeds to block (4070) and the blockchain client provides an access token to the user.

If the user's trust balance is not sufficient for successfully performing one or more resource accesses, the client device blockchain client performs one or more actions to acquire additional trust at block (4030). In an example embodiment, the blockchain client causes a host check module to perform a host check on the client device, for example to determine whether an antivirus scan was performed within a preceding time frame and that the client device operating system is properly patched. In an example embodiment, at block (4040) the client device blockchain client executes a smart contract to request authentication by an identity service, for example identity service (1100). The client device blockchain client provides the host check results to the identity service with the authentication request. In other example embodiments, the client device blockchain client, alternatively or in addition, executes a smart contract to append the host check results to the blockchain of the distributed trust ledger.

At block (4050) the client device blockchain client receives an authentication result, including a trust tuple that was generated by the identity service in response to the authentication result, and, at block (4060) receives an updated version of the distributed trust ledger that includes a block with the trust tuple appended to the blockchain. The client device blockchain client then provides an access token to the user at block (4070) following which process (7000) ends.

Client Device Protected Resource Access

Figure 5:
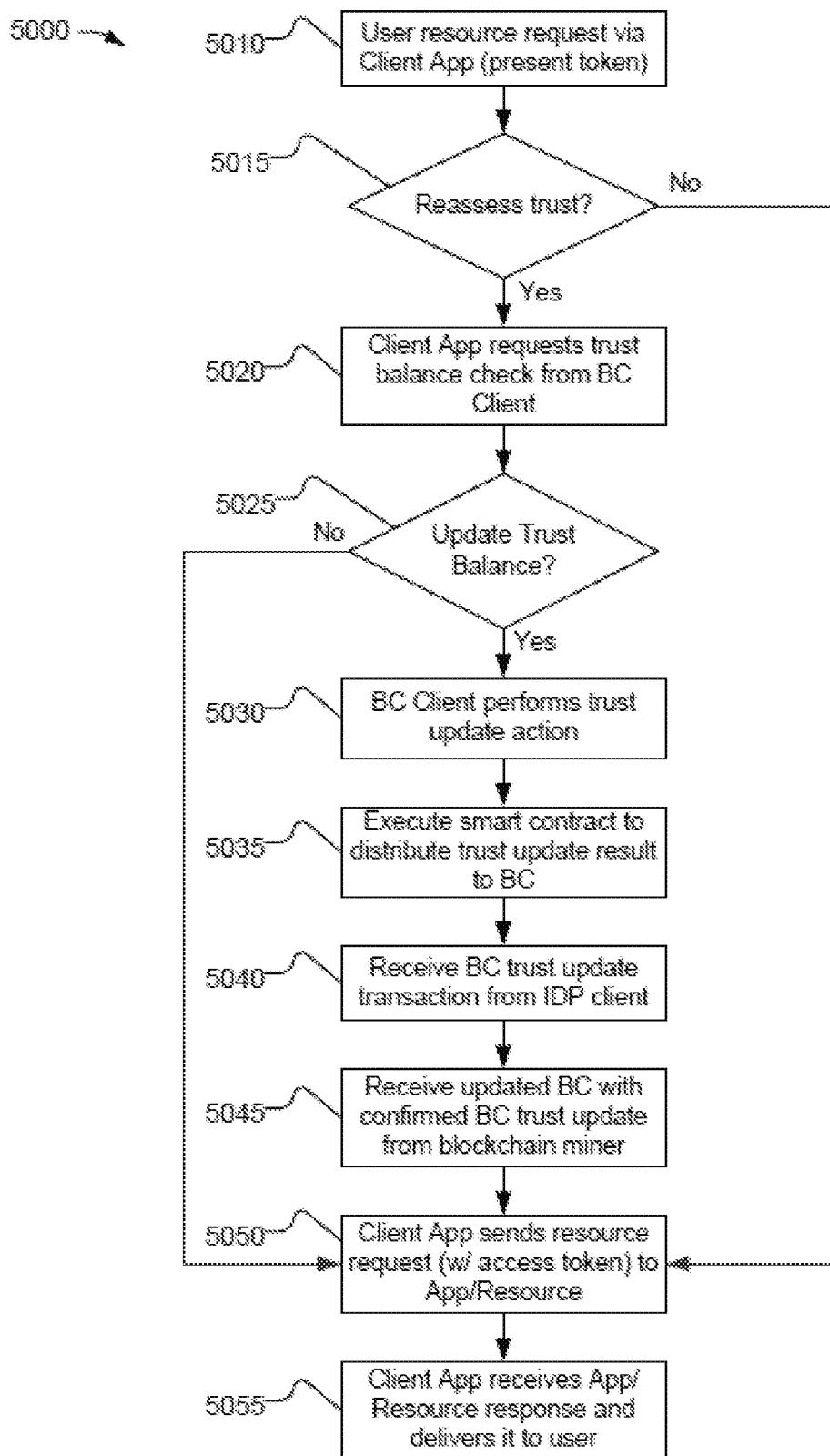
FIG. 5 is a flow diagram illustrating an example operation performed by a client device and a client device blockchain client when an authenticated user interacts with a client device application to request access to a protected application or resource, in accordance with one or more techniques of this disclosure.

FIG. 5 is a flow diagram illustrating an example operation (5000) performed by client device (1200) and client device blockchain client (1220) when an authenticated user, (e.g., a user in possession of an access token), interacts with a client device application (1240) to request access to a protected application or resource (1440), (e.g., at block (2034) of FIG. 2, block (3016) of FIG. 3A, and block (3064) of FIG. 3C), in accordance with one or more techniques of this disclosure.

At block (5010), a client device application, for example application (1230), receives an application or resource access request, including an access token, from a user (1250). At block (5015) the client device application determines whether a trust reassessment is necessary. In an example embodiment, the client device application determines that a trust reassessment is necessary if a configurable amount of time has elapsed or the client device application has received more than a configurable number of access requests since a preceding trust reassessment was performed. In another example embodiment, the client device application requests a trust reassessment responsive to a change in a client or user's trust balance, as detected for example by client device blockchain client (1220). In a further embodiment, the client device application requests a trust reassessment every time it receives an access request from a user. If a trust reassessment is not necessary, the client application, at block (5050), sends a resource request, including the user's account ID and the access token, to the relying party that includes the requested application or resource, for example to relying party (1400).

If the client device client application (1240) determines that trust should be reassessed, it sends a trust balance check request to the client device blockchain client (1220) at block (5020). The client device blockchain client accesses elements of the distributed trust ledger corresponding to the user's trust account and determines, at block (5025) whether a trust balance update is required. In an example embodiment, the user's trust account includes a requirement to perform a trust-related action, for example a requirement to perform a host check that was added to the user's trust account by a trust assessor, as discussed herein in relation to blocks (3050) through (3054) of FIG. 3B. In a further example embodiment, the client device blockchain client determines that a trust update is required if a TAB value associated with the user is less than a threshold amount. If the client device blockchain client determines that an update of the user's trust balance is not required, it proceeds to block (5050) and sends a resource request to the relying party.

If, at block (5025), the client device blockchain client determines that the user's trust account balance should be updated, then at block (5030) the client device blockchain client performs one or more actions to increase the user's TAB, e.g. by adding one or more trust facets to the user's account. For example, in an embodiment the client device blockchain client executes a smart contract to cause a host check module to perform a host check operation on the client device.

At block (5035) the client device blockchain client executes a smart contract to distribute the trust update result to the blockchain-based distributed trust layer. For example, the client device blockchain client executes a smart contract to add results of a host check operation to the block chain. In an example embodiment an IdP blockchain client receives, via the distributed trust ledger, the trust update result, executes a smart contract to increase the user's trust balance, and distributes the increased trust balance to the distributed ledger, which the client device blockchain client receives at block (5040).

At block (5045) the client device blockchain client receives, from the blockchain miners, an updated version of the blockchain-based distributed trust ledger with the results of the trust update and increased trust encoded in a block of the blockchain, following which the client application sends the resource request to the relying party at block (5050). The client application receives an application or resource response from the relying party and provides the response to the user at block (5055).

Identity Service

Figure 6:
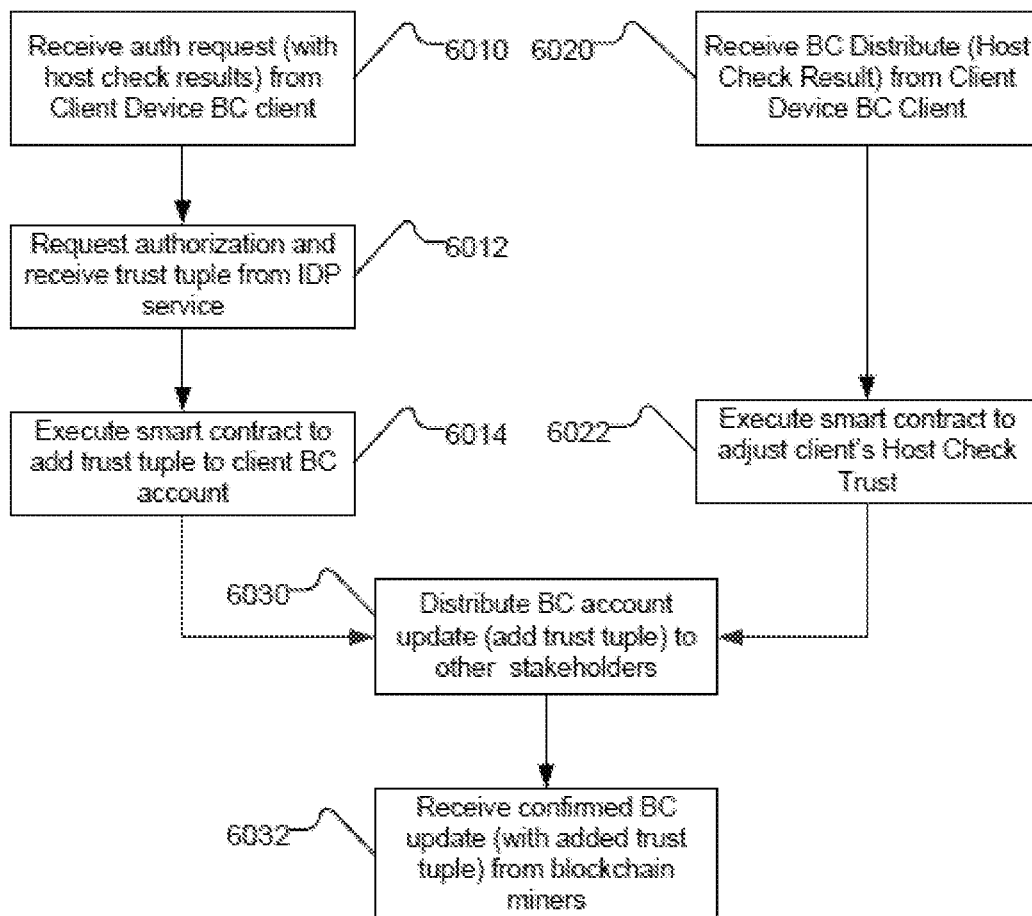
FIG. 6 includes a flowchart that illustrates an example operation performed by an identity service blockchain client, in accordance with one or more techniques of this disclosure.

FIG. 6 includes a flowchart that illustrates an example operation (6000) performed by identity service blockchain client (1120), in accordance with one or more techniques of this disclosure. At block (6010) the identity service blockchain client receives an authentication request, which can include results of a recent host check operation, from a client device blockchain client. The identity service blockchain client interacts with an IdP service, for example IdP service (1140), to request authentication of client device and user. If the IdP service is able to successfully authenticate the client device and user, it generates an authentication response, including a trust tuple, which the identity service blockchain client receives at block (6012). At block (6014) the identity service blockchain client executes a smart contract to add the trust tuple to an account associated with the user/client. In an alternative embodiment, the identity service blockchain client receives, at block (6020), via an update to the blockchain-based distributed trust ledger, a host check result performed by a host check operation on the client device. Responsive to the host check result, at block (6022) the identity service blockchain client executes a smart contract to adjust a trust account balance associated with the client device, for example by adding a facet of host check-specific trust to the client device user's trust account.

At block (6030) the identity service blockchain client distributes update(s) to a user's trust account balance to other system stakeholders, including blockchain miners, and receives, at block (6032) and updated version of the blockchain-based distributed trust ledger, including a block appended to the blockchain that includes the trust tuple or host check-specific trust added to the user's account.

Blockchain Miners

Figure 7:
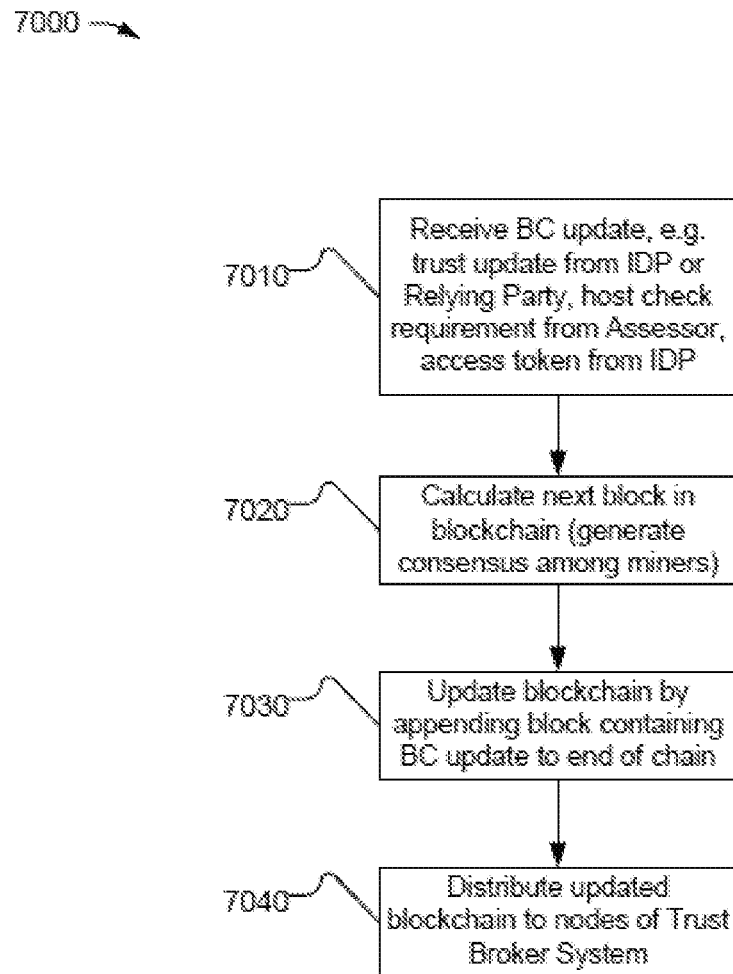
FIG. 7 is a flowchart that illustrates an example operation performed by a block chain miner, in accordance with one or more techniques of this disclosure.

FIG. 7 is a flowchart that illustrates an example operation (7000) performed by block chain miners (1360, 1370), in accordance with one or more techniques of this disclosure. At block (7010) the block chain miners receive an update to the blockchain-based distributed trust ledger, for example a transaction that the blockchain miners are tasked with encoding in a new block to be appended to the blockchain. The update to the block chain is made by a stakeholder in the Trust Broker System. For example, an update can include a transaction to add trust tuple generated by IdP blockchain client (1120) at block (2022) of FIG. 2, a trust balance decrease transaction added by relying party blockchain client (1462) at block (3036) of FIG. 3A, or a requirement for a host check to be performed added by trust assessor blockchain client at block (3054) of FIG. 3B. At block (7020) the blockchain miners calculate the next block of the distributed trust ledger blockchain, which includes the received update, by performing calculations using a consensus algorithm, for example a proof of work consensus algorithm. At block (7030) the blockchain miners update the blockchain by appending the newly calculated block to the end of the blockchain and, at block (7040) distribute the updated blockchain to blockchain clients and blockchain explorers of Trust Broker System stakeholders, for example blockchain nodes of client device (1200), trust assessor (1500), relying party (1300), and identity service (1100).

Relying Party

Figure 8:
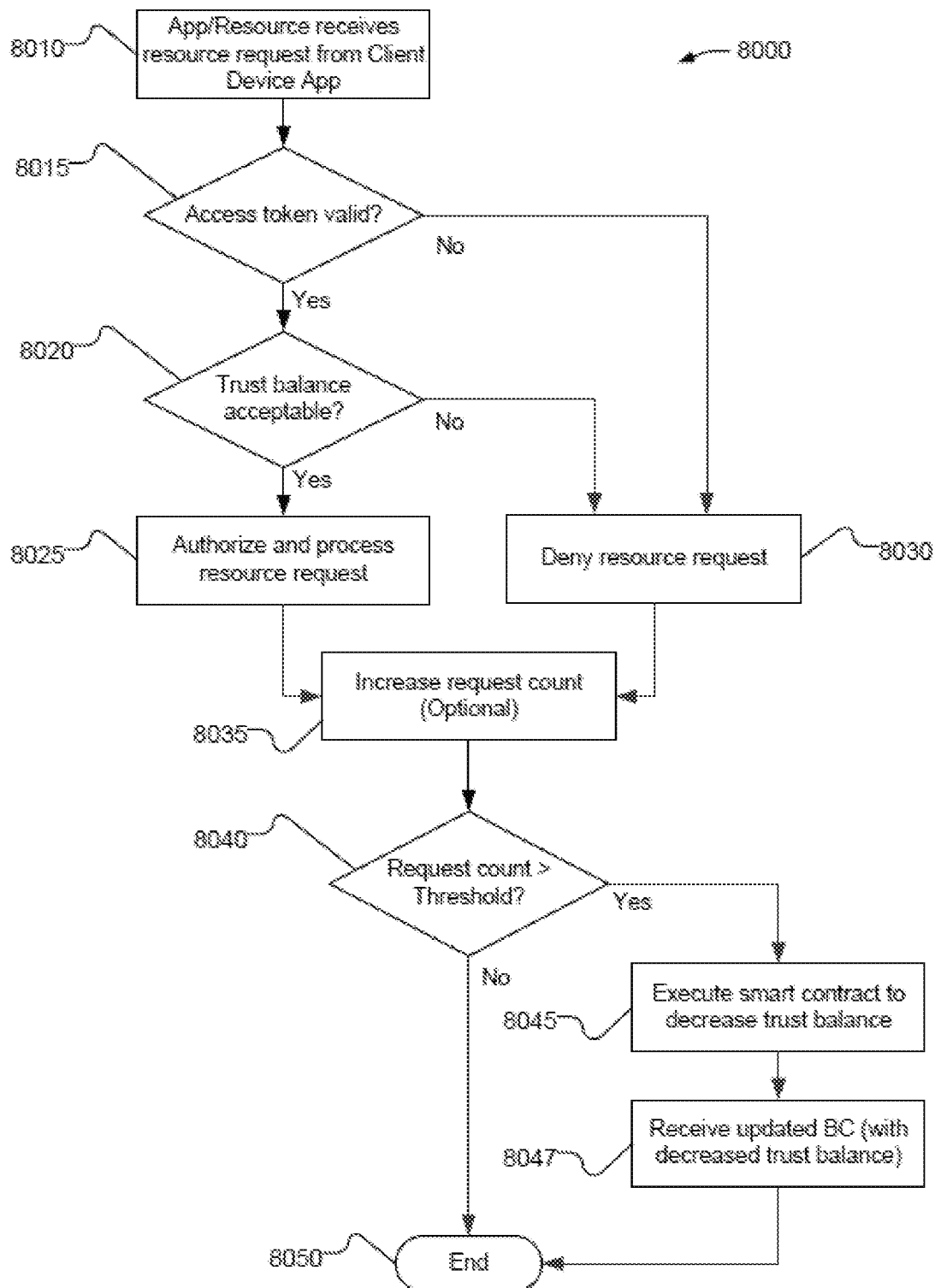
FIG. 8 is a flow diagram that illustrates an example operation performed by a relying party blockchain explorer and an application or resource, in accordance with one or more techniques of this disclosure.

FIG. 8 is a flow diagram that illustrates an example operation (8000) performed by relying party blockchain explorer (1460) and application or resource (1430), in accordance with one or more techniques of this disclosure. At block (8010) application or resource (1430) receives a resource request from a client device application (1230), for example at block (2036) of FIG. 2 or block (3018) of FIG. 3A. The application/resource request includes an account ID associated with the client making the resource request and an access token.

At block (8015) the relying party application or resource determines whether or not the access token if valid, for example whether it is associated with the account ID and was generated by a Trust Broker System IdP. If the token is not valid, the application/resource denies the access request (8030). If the access token is valid, the application or resource queries the relying party blockchain client (1462) at block (8020) to determine whether trust account associated with the account ID includes sufficient trust account balance. In an example embodiment, the application/resource determines that the trust account balance is sufficient if it includes a TAB value greater than a configurable value required for the requested access. In some example embodiments, the application or resource determines that the trust account balance is sufficient if the trust account includes one or more trust facets required, for example by an access policy, for the requested access instead of or in addition to a sufficient TAB amount. If the trust balance is sufficient, the application or resource authorizes and processes the access request at block (8025). If the trust balance is not sufficient, the application or resource denies the resource request at block (8030).

In some example embodiments, relying party (1300) tracks resource access requests and reduces trust in a requesting application or client following a configurable number of access requests from the application or client. Following either a successful resource access (8025) or a denied resource request (8030) the application or resource (1430) interacts with the relying party blockchain client to increase a count of resource access attempts at block (8035). This interaction is illustrated, for example, at blocks (3028) and (3034) of FIG. 3A. At block (8040) the application blockchain explorer (1460) determines whether the request count is greater than a configurable number of allowable access attempts, for example greater than 1000 access attempts. If the request count is less than the threshold, process (8000) ends. If the request count is greater than the threshold amount, the relying party blockchain client executes a smart contract to decrease the requesting client's trust account balance, i.e. trust account balance associated with the account ID at block (8045). For example, the relying party blockchain client reduces the trust balance by one unit of TAB after 1000 access attempts. The blockchain client distributes the trust account balance reduction to other Trust Broker System stakeholders, including blockchain miners, and receives, from the blockchain miners, and update blockchain-based distributed trust ledger including the decreased trust account balance at block (8047), following which method (8000) ends.

Trust Assessor

Figure 9:
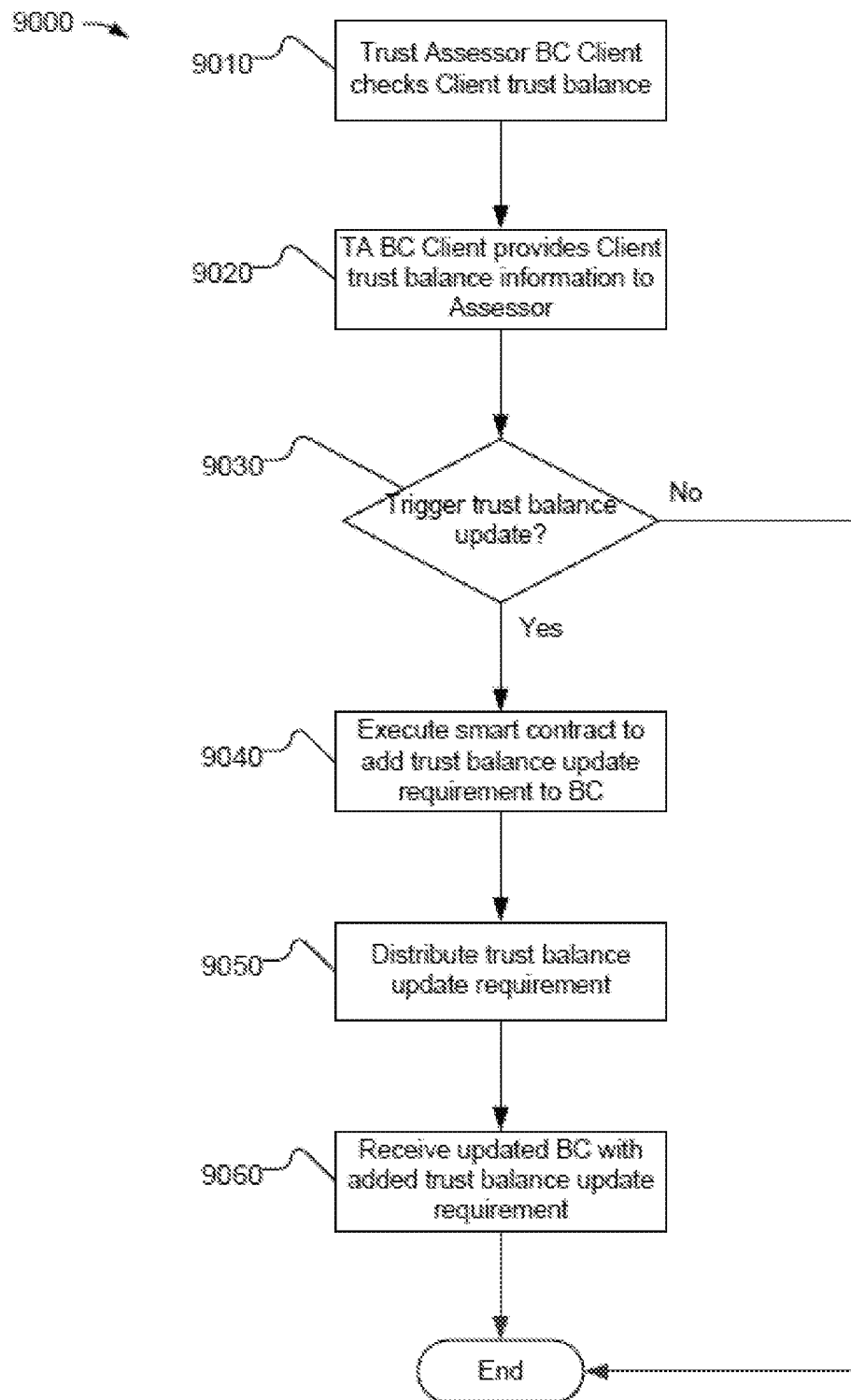
FIG. 9 is a flow diagram that illustrates an example operation performed by a trust assessor blockchain client and an assessor, in accordance with one or more techniques of this disclosure.

FIG. 9 is a flow diagram that illustrates an example operation (9000) performed by trust assessor blockchain client (1520) and assessor (1540), in accordance with one or more techniques of this disclosure. At block (9010) a trust assessor blockchain client (1520) checks a trust account balance associated with a user or client. In an example embodiment, the trust assessor blockchain client checks a trust account balance in response to receiving an updated copy of the distributed trust ledger from one or more blockchain miners. In example embodiments, the trust assessor checks trust account balances periodically, in response to receiving a change to the distributed trust ledger from an application/resource blockchain client, or in response to receiving a notification from a relying party or from a client device, for example a notification of a login failure due to a particular trust facet being missing from a user's or client's trust account. At block (9020) the trust assessor blockchain client provides trust account balance information to assessor (1540).

At block (9030) the assessor determines whether the trust information should trigger a trust account balance update. For example, the assessor receives notification that a user's TAB has been decremented by a relying party at block (9020) and determines, at block (9030) that the user's TAB should be increased. In another example embodiment, the trust assessor receives a notification that a client's access request was denied due to a missing HIPAA trust facet at block (9020) and determines, at block (9030), that a HIPAA trust facet should be added to the client's trust account by a HIPAA assessor. If, at block (9030), the assessor determines that a trust account should not be updated, process (9000) ends.

Otherwise, the assessor executes a smart contract at block (9040) to add, to the distributed trust ledger, a specific trust facet or an increase in TAB of user's trust account or a requirement that an action to increase trust should be performed. For example, at block (9040) the assessor executes a smart contract with the trust assessor blockchain client to cause the blockchain client to add, to a client's distributed ledger account, a requirement that the client perform a host check or execute a smart contract to request a HIPAA trust facet from a HIPAA assessor.

At block (9050) the trust assessor blockchain client distributes the added trust or trust-related requirement to Trust Broker System stakeholders, including blockchain miners, and receives an updated distributed trust ledger, including the added trust or trust-related requirement, from the blockchain miners at block (9060), following which process (9000) ends.

Use Cases

A customer has multiple secure access solutions from different vendors, but wants to share the user, client application and client device trust & compliance assessment across the different solutions. E.g. the same trust scores can be observed by the customer's IDP/IDaaS service, VPN solution, FW providers and Cloud IaaS infrastructure services.

Customer doesn't want to burden their end-users and client devices with a full compliance check each and every SSO session or every resource request. Instead the multi-value trust balance can be carried over from one session to another. Critical applications may require more frequent compliance or trust checks and may initiate additional checks.

A customer wants to use a private or 3rd party service for device host or compliance checking. The host/compliance checking service can add a trust facet/value into the user's accounts, which then can be incorporated into access policy definitions. The host/compliance check service can run completely autonomous on a daily, weekly or monthly basis.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as RAM, read-only memory (ROM), non-volatile random access memory (NVRAM), EEPROM, Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A trust broker system which enables a relying party to control network service access of a client device, the trust broker system comprising:
   one or more computing devices configured to maintain a trust ledger including a trust account balance (TAB) associated with each user of a set of users, wherein:

the TAB associated with each user of the set of users represents a value used to determine whether a respective user is permitted to access a resource, and by maintaining the trust ledger, the one or more computing devices enable each device of a set of devices having access to the trust broker system to:

receive, by a respective device of the set of devices, a request for a TAB associated with a user of the set of users;

receive a request from a user of the set of users to authenticate the user with a blockchain client of the client device, wherein the client device is included in the set of devices having access to the trust broker system;

determine, based on the trust ledger, the TAB associated with the user of the set of users wherein the TAB associated with the user is recorded in the trust ledger;

output, by the respective device of the set of devices, information indicative of the TAB associated with the user of the set of users;

execute a first smart contract with an identity provider (IdP) blockchain client of an identity broker device to authenticate the user with an IdP service of the identity broker device, wherein the IdP service is included in the set of devices having access to the trust broker system;

based on the IdP service authenticating the user, execute a second smart contract to initiate a TAB update transaction to change the TAB associated with the user; and distribute the TAB update transaction to each device of the set of devices having access to the trust broker system.

2. The trust broker system of claim 1, wherein the one or more computing devices are further configured to:

receive the TAB update transaction;

execute, in response to receiving the TAB update transaction, consensus algorithms to update the TAB associated with the user in the trust ledger to create an updated trust ledger; and distribute the updated trust ledger to each device of the set of devices having access to the trust broker system.

3. The trust broker system of claim 2, wherein:

by maintaining the trust ledger, the one or more computing devices enable the client device to:

receive, by a client application of the client device, an application resource request from the user of the set of users; and output, from the client application, the application resource request, and by maintaining the trust ledger, the one or more computing devices enable the relying party to:

receive the application resource request;

determine, based on the trust ledger, the TAB associated with the user of the set of users; and in response to the TAB associated with the user being greater than or equal to a TAB threshold, process the application resource request.

4. The trust broker system of claim 3, wherein by maintaining the trust ledger, the one or more computing devices enable the relying party to:

maintain a list that includes a number of application resource requests associated with each user of the set of users received by the relying party;

in response to the number of application resource requests associated with the user exceeding a threshold number of application resource requests, determine that a trust reassessment is required for the user; and execute a smart contract to decrease the TAB associated with the user; and distribute a TAB decrease transaction to each device of the set of devices having access to the trust broker system.

5. The trust broker system of claim 1, further comprising a trust assessor configured to:

receive, from the one or more computing devices, an indication that the TAB associated with the user of the set of users is updated;

reassess the TAB associated with the user by comparing the TAB with a TAB threshold; and in response to the TAB being less than the TAB threshold, execute a smart contract to initiate a host check to increase the TAB associated with the user of the set of users.

6. The trust broker system of claim 1, wherein the one or more computing devices comprise one or more blockchain miner devices.

7. The trust broker system of claim 1, wherein the TAB corresponding to each user of the set of users may be within a range from 0 to 1000.

8. The trust broker system of claim 2, wherein the consensus algorithms include a proof-of-work algorithm, a proof-of-stake algorithm, and or a proof-of-time algorithm.

9. The trust broker system of claim 1, wherein the TAB associated with each client of a set of clients changes at a TAB change rate.

10. The trust broker system of claim 9, wherein:

the TAB associated with each client of the set of clients increases at the TAB change rate; or the TAB associated with each client of the set of clients decreases at the TAB change rate.

11. A method comprising:

maintaining, using one or more computing devices, a trust ledger including a trust account balance (TAB) associated with each user of a set of users, wherein:

the TAB associated with each user of the set of users represents a value used to determine whether a respective user is permitted to access a resource, and by maintaining the trust ledger, the method further comprises enabling each device of a set of devices having access to a trust broker system to perform:

receiving, by a respective device of the set of devices, a request for a TAB associated with a user of the set of users;

receiving a request from a user of the set of users to authenticate the user with a blockchain client of a client device, wherein the client device is included in the set of devices having access to the trust broker system;

determining, based on the trust ledger, the TAB associated with the user of the set of users wherein the TAB associated with the user is recorded in the trust ledger;

outputting, by the respective device of the set of devices, information indicative of the TAB associated with the user of the set of users;

executing a first smart contract with an identity provider (IdP) blockchain client of an identity broker device to authenticate the user with an IdP service of the identity broker device, wherein the IdP service is included in the set of devices having access to the trust broker system;

based on the IdP service authenticating the user, executing a second smart contract to initiate a TAB update transaction to change the TAB associated with the user; and distributing the TAB update transaction to each device of the set of devices having access to the trust broker system.

12. The method of claim 11, further comprising:

receiving the TAB update transaction;

executing, in response to receiving the TAB update transaction, consensus algorithms to update the TAB associated with the user in the trust ledger to create an updated trust ledger; and distributing the updated trust ledger to each device of the set of devices having access to the trust broker system.

13. The method of claim 11, wherein:

by maintaining the trust ledger using the one or more computing devices, enabling the client device to perform:

receiving, by a client application of the client device, an application resource request from the user of the set of users; and outputting, from the client application, the application resource request, and by maintaining the trust ledger using the one or more computing devices, enabling a relying party to:

receiving the application resource request;

determining, based on the trust ledger, the TAB associated with the user of the set of users; and in response to the TAB associated with the user being greater than or equal to a TAB threshold, processing the application resource request.

14. The method of claim 13, wherein by maintaining the trust ledger using the one or more computing devices, enabling the client device to perform:

maintaining a list that includes a number of application resource requests associated with each user of the set of users received by the relying party;

in response to the number of application resource requests associated with the user exceeding a threshold number of application resource requests, determining that a trust reassessment is required for the user;

executing a smart contract to decrease the TAB associated with the user; and distributing a TAB decrease transaction to each device of the set of devices having access to the trust broker system.

15. The method of claim 11, further comprising:

receiving, by a trust assessor and from the one or more computing devices, an indication that the TAB associated with the user of the set of users is updated;

reassessing, by the trust assessor, the TAB associated with the user by comparing the TAB with a TAB threshold; and in response to the TAB being less than the TAB threshold, executing, by the trust assessor, a smart contract to initiate a host check to increase the TAB associated with the user of the set of users.

16. The method of claim 11, wherein the one or more computing devices comprise one or more blockchain miner devices.

17. Non-transitory computer-readable media comprising instructions that when executed cause one or more processors to:

maintain a trust ledger including a trust account balance (TAB) associated with each user of a set of users, wherein:

the TAB represents a value used to determine whether a respective user is permitted to access a resource, and by maintaining the trust ledger, the one or more processors enable each device of a set of devices having access to a trust broker system to:

receive, by a respective device of the set of devices, a request for a TAB associated with a user of the set of users;

receive a request from the user of the set of users to authenticate the user with a blockchain client of a client device, wherein the client device is included in the set of devices having access to the trust broker system;

determine, based on the trust ledger, the TAB associated with the user of the set of users, wherein the TAB associated with the user is recorded in the trust ledger;

output, by the respective device, information indicative of the TAB associated with the user of the set of users;

execute a first smart contract with an identity provider (IdP) blockchain client of an identity broker device to authenticate the user with an IdP service of the identity broker device, wherein the IdP service is included in the set of devices having access to the trust broker system;

based on the IdP service authenticating the user, execute a second smart contract to initiate a TAB update transaction to change the TAB associated with the user; and distribute the TAB update transaction to each device of the set of devices having access to the trust broker system.

18. The non-transitory computer-readable media of claim 17, wherein the instructions cause the one or more processors to:

receive the TAB update transaction;

execute, in response to receiving the TAB update transaction, consensus algorithms to update the TAB associated with the user in the trust ledger to create an updated trust ledger; and distribute the updated trust ledger to each device of the set of devices having access to the trust broker system.

19. The non-transitory computer-readable media of claim 18, wherein:

by maintaining the trust ledger, the one or more processors enable the client device to:

receive, by a client application of the client device, an application resource request from the user of the set of users; and output, from the client application, the application resource request, and by maintaining the trust ledger, the one or more processors enable a relying party to:

receive the application resource request;

determine, based on the trust ledger, the TAB associated with the user of the set of users; and in response to the TAB associated with the user being greater than or equal to a TAB threshold, process the application resource request.

20. The non-transitory computer-readable media of claim 18, wherein by maintaining the trust ledger, the one or more processors enable the relying party to:

maintain a list that includes a number of application resource requests associated with each user of the set of users received by the relying party;

in response to the number of application resource requests associated with the user exceeding a threshold number of application resource requests, determine that a trust reassessment is required for the user; and execute a smart contract to decrease the TAB associated with the user; and distribute a TAB decrease transaction to each device of the set of devices having access to the trust broker system.

* * * * *